Jan. 29, 1952 W. H. MARSHALL, JR 2,583,585
PRODUCTION OF HYDRAZINE HYDRATE
Filed Aug. 6, 1946
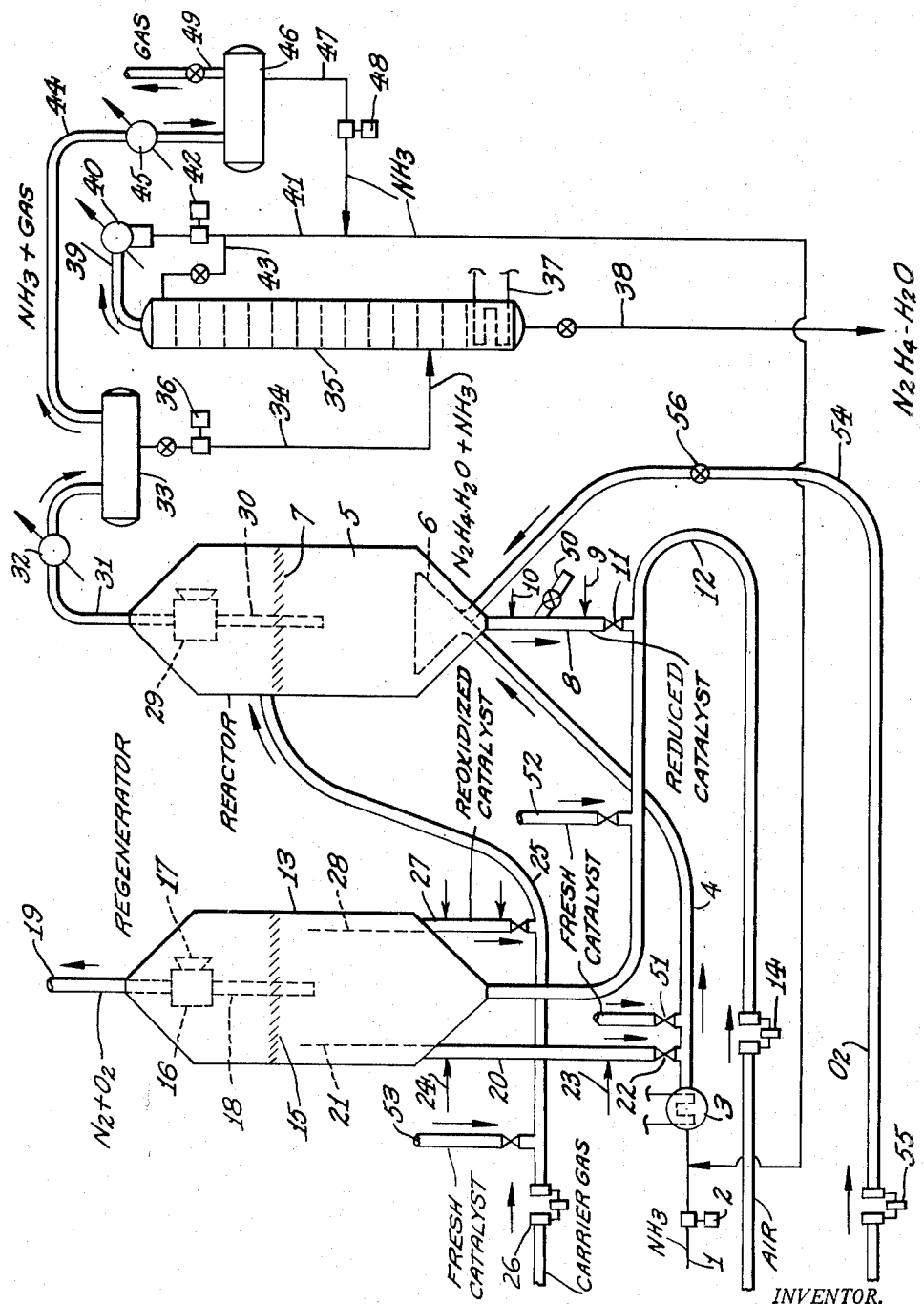
INVENTOR.
WALTON H. MARSHALL JR.
BY E. F. Liebrecht
D. W. Palmer
ATTORNEYS Patented Jan. 29, 1952

2,583,585

UNITED STATES PATENT OFFICE 2,583,585

PRODUCTION OF HYDRAZINE HYDRATE

Walton H. Marshall, Jr., New York, N. Y., assignor to The M. W. Kellogg Company, Jersey City, N. J., a corporation of Delaware Application August 6, 1946, Serial No. 688,719

21 Claims. (Cl. 23—190)

This invention relates to an improved method for converting ammonia to hydrazine hydrate.

Heretofore hydrazine hydrate has been manufactured by reacting hypochlorite solution with ammonia, the hypochlorite solution being prepared from sodium hydroxide and chlorine. The reactants for the preparation of hydrazine hydrate by this method are, therefore, 2 molecules of ammonia, 1 molecule of chlorine, and 2 molecules of sodium hydroxide for each molecule of hydrazine hydrate. This method has the disadvantage that the relatively expensive reactants, sodium hydroxide and chlorine, are actually only intermediates in the process and are represented in the products as relatively worthless sodium chloride and water. Aside from the material loss which these products represent, their presence in the reaction product is a positive disadvantage, since they must be separated from the hydrazine hydrate product.

It is an object of this invention to provide an improved method for the conversion of ammonia to hydrazine hydrate, which method requires no expensive reagents other than ammonia, and which requires no reagents which are necessarily recovered in any form other than hydrazine hydrate. It is a further object of the invention to provide a process for manufacturing hydrazine hydrate in which the recovery of the hydrazine hydrate product is a relatively simple operation. It is a still further object of the invention to provide a process for making hydrazine hydrate at a unit cost substantially lower than that of the prior process referred to above.

In accordance with the improved method hydrazine hydrate is produced by directly reacting ammonia with a reducible metal oxide. This method does not require the use of alkalis, halogens or hypohalites, and preferably these reagents are entirely absent. The ammonia is oxidized directly to hydrazine hydrate by oxygen which is supplied by reduction, in the reaction zone, of the reducible metal oxide. Any metal oxide which is readily reducible under the conditions of reaction may be employed, such as oxides of metals of the right hand column of group I of the periodic table, tin, zinc, lead and cadmium. Silver oxide is a preferred oxidizing agent in the improved process.

The oxidizing agents serve as the means for supplying oxygen to the reaction zone, and may also exert some true catalytic effect. For convenience the oxidizing agent is referred to hereinafter as the "catalyst," although it is to be understood that the function of this "catalyst" in the reaction zone may be limited to supplying oxygen to the reaction.

In accordance with the improved process oxygen is supplied to the reaction in chemical combination in the catalyst. The catalyst is reduced to a lower state of oxidation, for example to the metallic condition, in giving up oxygen to the reaction. It is necessary, therefore, to reoxidize the catalyst, continuously or intermittently, to supply oxygen to the reaction. This can be accomplished by employing a plurality of fixed masses of the catalyst in a granular condition and subjecting one mass to oxidation while the ammonia is being treated by passage through another, previously oxidized, mass of the catalyst.

Instead of using fixed masses of catalyst and transferring the flow of ammonia and oxidizing gas, these gases may be passed continuously through separate reaction and reoxidizing zones while the catalyst is moved cyclically through such zones. In this arrangement granular catalyst may be moved downwardly through the reaction and reoxidizing zones in the form of a "moving bed" of granular catalyst while the ammonia and oxidizing gas are passed through their respective zones upwardly in counter-current contact with the catalyst, or downwardly and concurrently with the catalyst.

It is believed more advantageous, however, for temperature control and for simplification of the mechanical equipment required, to employ the catalyst as a relatively fine powder and transfer it in suspension in gaseous vehicles between reaction and reoxidizing zones.

The invention will be described in more detail by reference to this last-mentioned method of operation, which is illustrated diagrammatically in the drawing. It will be understood, however, that the invention is not limited in its specific application to this mode of operation but may be carried out with any suitable means for contacting the ammonia with the catalyst.

Referring to the drawing, ammonia is introduced into the process through line 1, which is provided with a pump 2 for imposing pressure on the reaction zone. While anhydrous ammonia ordinarily is employed, the presence of small amounts of water, up to 25 percent of the total mixture, may be tolerated. Line 1 is connected to heater 3 for heating and vaporizing the ammonia to the desired temperature level. From heater 3 the ammonia vapors are passed through line 4 into reactor 5.

Reactor 5 is preferably a vertically cylindrical vessel adapted to withstand the relatively high operating pressure and to contain a mass of finely divided catalyst. The ammonia vapors are introduced into the lower part of reactor 5 through a distributor head 6 which is connected to line 4 in order to distribute the ammonia vapors horizontally across the lower part of reactor 5. In reactor 5 the ammonia vapors are passed upwardly at linear velocity adapted to maintain the catalyst powder in suspension in the gas in a "fluidized" condition. Under these conditions the bed of catalyst powder assumes the form, and some of the properties, of a boiling liquid in a condition which may be described as "pseudo-liquid." The linear velocity of the gas necessary to maintain the catalyst in this desired condition in reactor 5 depends upon the density and condition of the catalyst material, but suitable velocities ordinarily will fall in the range of 0.1 to 10 feet per second, preferably 0.5 to 5. This is the velocity the gas would assume without reaction in an empty reactor, and is designated "superficial velocity." Under these conditions the bulk of the catalyst in the reactor assumes the form of a pseudo-liquid mass of relatively high density which occupies the lower part of reactor 5. In this dense phase the catalyst density may vary from 10 to 100 pounds per cubic foot, depending upon the character and condition of the catalyst and the linear velocity of the gaseous reactants.

Overlaying the dense phase of the catalyst in reactor 5 is a diffuse phase of relatively low density occupying the upper portion of the reactor substantially between the dense phase and the outlet. Between the dense phase and the diffuse phase there is a relatively narrow zone in which the catalyst density changes rapidly from the relatively high density of the dense phase to the relatively low density of the diffuse phase. This zone of rapidly changing catalyst density constitutes a visual interface between the catalyst phases and may be described as an "interface."

The aggregate area of the vapor outlets in header 6 is substantially smaller than the cross-sectional area of reactor 5 whereby the velocity of the entering vapors is sufficiently high in the header outlets to prevent the passage of catalyst from reactor 5 into the header.

The circulation of catalyst in the dense phase in reactor 5 results in substantially uniform temperature conditions throughout the mass. The heat of reaction may be absorbed, in order to maintain the reaction temperature at the desired level, by introducing the ammonia and catalyst through line 4 at a temperature such that their capacity for absorbing heat by being heated to the reaction temperature is sufficient to absorb the heat of reaction.

The quantity and degree of oxidation of the catalyst in reactor 5 are maintained sufficiently high to supply oxygen to the reaction at the necessary rate. This is accomplished by continuously withdrawing a part of the catalyst from reactor 5 and replacing it with relatively highly oxidized catalyst, the rate of replacement being effective to maintain the level of the dense phase at the desired height, indicated diagrammatically in the drawing at 7.

Conveniently, catalyst is withdrawn from reactor 5 directly from the dense catalyst phase. For this purpose the distribution header 6 is spaced somewhat above the bottom of reactor 5, which is conical in shape, in order to provide a passage for the accumulation of powdered catalyst under header 6. From the bottom of reactor 5 catalyst is withdrawn through an elongated vertical pipe 8, which may serve as a standpipe. Into standpipe 8 inert gases or steam, preferably the former, are introduced at 9 and 10 to strip reaction products and ammonia out of the catalyst passing out of reactor 5 and to maintain the catalyst in the bottom of reactor 5 and in standpipe 8 in a fluidized, readily flowable, condition. The stripping and aerating gases pass into the reactor and are mingled with the reaction product.

The fluidized column of catalyst in standpipe 8 develops a pressure in the bottom of the standpipe which is similar to that developed by a column of liquid and which may be described, therefore, as "hydrostatic." The pressure difference between the top and bottom of standpipe 8 depends upon the length of the standpipe, the actual density of the catalyst, and the apparent density of the fluidized mass. The apparent density of the fluidized mass depends upon the amount of aeration of the column which is provided by gases introduced at 9 and 10. Ordinarily, the quantity of gas introduced directly into the standpipe need be no more than is necessary to maintain the catalyst in a flowable condition. The upward velocity of the gas may, therefore, be substantially lower than the linear velocity in reactor 5. However, in order to strip reactants and product from the column of catalyst passing downwardly through standpipe 8 it may be necessary to inject more gas at 9 and 10 than the minimum required for aeration. In addition to the aerating and stripping gas introduced at 9 and 10 directly into standpipe 8 it may be desirable or necessary to introduce aerating and stripping gas also directly into the bottom of reactor 5 at a point in the conical section thereof below the top of distributor 6.

The catalyst withdrawn from reactor 5 through standpipe 8 passes through valve 11 into a transfer line 12, through which the catalyst is to be transported to regenerator, or re-oxidizer, 13. The regenerator is a vessel of the same general shape as reactor 5 and adapted also to contain a fluidized mass of the catalyst at a temperature level effective to oxidize the catalyst to the desired state of oxidation. Regenerator 13 may be larger, or smaller, than reactor 5 and the mass of catalyst maintained therein may be greater, or less, than the mass maintained in reactor 5. The linear velocity of the aerating medium employed in regenerator 13 to aerate the catalyst as a fluidized mass and effect oxidation thereof may be greater, or less, than the linear velocity employed in reactor 5, although the velocities ordinarily employed will fall within the range specified for reactor 5.

The re-oxidizing or regenerating medium which is most available and economical for use in regenerator 13 is air, although gaseous oxygen, or air enriched with added oxygen, may be employed. The use of air is desirable for reasons of economy and also because the proportion of air which is absorbed by the oxidation reaction does not interfere with proper fluidization of the mass of catalyst in regenerator 13. The air is introduced into the process through line 12 by means of a suitable compressor 14 at a pressure sufficiently higher than the pressure to be maintained in regenerator 13 to overcome the pressure drop experienced by the air stream in passing through line 12 from the compressor to the bottom of regenerator 13 while conveying in suspension the catalyst which is received from standpipe 8. The factors, described above, which govern the hydrostatic pressure developed at the bottom of standpipe 8 at the entrance to valve 11 are regulated to provide a pressure at that point approximately 3 to 5 pounds greater than the pressure in line 12 adjacent standpipe 8. This pressure differential permits the passage of catalyst downwardly through valve 11 into line 12 while preventing the flow of air from line 12 upwardly into standpipe 8, and provides a margin of safety in the event of surges in the pressure in line 12.

The quantity of catalyst maintained in regenerator 13 is adjusted to the amount necessary to provide an effective residence time of catalyst in regenerator 13 while supplying re-oxidized catalyst to reactor 5 at the rate necessary to sustain the reaction. Whether the quantity of catalyst maintained in regenerator 13 is greater or less than the quantity maintained in reactor 5 is within the choice of the operator as it is dependent upon the degree of conversion, per pass, of the ammonia desired in reactor 5, the feed weight ratio of ammonia and catalyst charged to reactor 5, and other economic factors. The bulk of the catalyst maintained in regenerator 13 and the degree of fluidization thereof ordinarily will result in the maintenance of the interface, or upper level of the dense phase, at a relatively high point, indicated diagrammatically at 15.

The air stream, carrying catalyst in suspension, passes into regenerator 13 at a low point therein. The entrance for the air stream is relatively small in relation to the horizontal cross-sectional area of regenerator 13 whereby the velocity of the entering air stream is too high to permit the passage of catalyst downwardly out of regenerator 13 into line 12. The air stream passes upwardly through regenerator 13 at the velocity selected to produce the desired degree of fluidization of the catalyst bed and to provide the required residence time of the air stream in the regenerator, and passes out of the regenerator through an exit located at a relatively high point. As the catalyst is in a relatively finely divided condition, consisting preferably of particles having diameters not substantially greater than 150 microns, it is evident that at least a part of the catalyst mass will consist of particles whose free settling rate is less than the velocity of the air stream in the upper part of regenerator 13. It is desirable, consequently, to subject the air stream leaving regenerator 13 to suitable treatment to remove catalyst which is being carried out of the regenerator by entrainment. For this purpose one or more cyclone separators, indicated diagrammatically at 16, may be provided. Such cyclones conveniently are located inside regenerator 13 in the upper portion thereof and are provided with pipes 17 extending downwardly therefrom to return catalyst separated in the cyclones to the dense phase. In order to prevent the flow of air upwardly through line 17 the latter may be operated as a standpipe by suitable aeration of the catalyst mass therein to provide a hydrostatic pressure at the bottom of line 17 greater than the pressure at the inlet of cyclone 16 at 18. It is desirable also to extend standpipe 17 a substantial distance below the upper level of the dense phase of catalyst in order to maintain a fluidized column of catalyst in line 17.

If the catalyst contains extremely fine material the cyclones at 16 ordinarily will not be sufficient to remove the last traces of catalyst from the air stream passing out of regenerator 13. Consequently, the air stream flowing out of the cyclones through line 19 may be passed to other, more expensive but more efficient, separating means to recover catalyst to the degree of efficiency required by the economics of the process. Such other separating means may be an electrical precipitator from which the separated catalyst is returned to the process by any suitable means. Preferably the air stream passing through line 19 is subjected to heat exchange to recover the heat contained therein and cool the gas to a relatively low temperature prior to passage to an electrical precipitator. Alternatively, the cool air stream may be sprayed with a suitable liquid, such as water, to remove the catalyst therefrom and recover it as a slurry, from which it is removed and prepared for reuse by filtration and drying.

The oxidation of the catalyst in regenerator 13 is exothermic, so that after the process is started it should be necessary to preheat the air stream in line 12, if at all, only to the temperature necessary to avoid cooling the catalyst mass in regenerator 13 below the temperature level most efficient for oxidation of the catalyst. The most efficient operating temperature for regenerator 13 is relatively high so that the temperature rise experienced by the air stream passing through the regenerator ordinarily will be sufficient to absorb all the heat of the reaction. If it is necessary to provide other cooling means for regenerator 13 this can be provided by withdrawing part of the catalyst, cooling it, and returning it directly to regenerator 13, or by placing in regenerator 13 indirect heat exchange means, such as cooling coils.

The catalyst is continuously withdrawn from regenerator 13 for return to reactor 5 by any suitable means. Conveniently the catalyst is withdrawn directly from the dense phase in regenerator 13 by means of standpipe 20, which connects with line 4. By this means the catalyst passing downwardly through standpipe 20 is picked up by the stream of ammonia vapor passing to reactor 5 and carried in suspension in that stream into the reactor. In order to obtain well oxidized catalyst for return to the reactor standpipe 20 is effectively extended upwardly a substantial distance in regenerator 13 by the provision of a vertical partition 21 which extends across a segment of the horizontal cross-section of regenerator 13 to provide a separate column of catalyst directly over standpipe 20. The operation of standpipe 20 is substantially the same as that of standpipe 8 and is governed by the same considerations of stripping of the unwanted gases from the catalyst particles and maintaining the required hydrostatic pressure at the entrance to valve 22. Aeration and stripping means are provided at 23 and 24 and at other points in the column of catalyst provided by standpipe 20 and partition 21.

The heat content of the hot catalyst introduced into the ammonia stream through standpipe 20 may be employed in heating the ammonia stream to the temperature necessary in line 4. When the catalyst is circulated at a relatively high rate the heat content of the catalyst from standpipe 20 may be sufficient to supply all the heat necessary to vaporize and heat the ammonia to the desired temperature in line 4. In any case the hot catalyst from standpipe 20 will supply at least a part of the heat necessary, although it may be necessary to supply supplementary heating at 3.

Alternatively it may be desired to introduce the reoxidized catalyst into reactor 5 without prior contact with the ammonia. For this purpose a separate transfer line 25, provided with a compressor 26, is provided to supply catalyst from regenerator 13 to line 25. Standpipe 27 and partition 28 are provided to function in the same manner as standpipe 20 and partition 21. Inasmuch as the catalyst transported through line 25 may be introduced into reactor 5 at a point near or above the upper level of the dense phase at 7, the pressure in line 25 may be substantially less than the pressure in line 4, as there is no necessity for overcoming the hydrostatic pressure head exerted by the mass of fluidized catalyst in reactor 5. Consequently, the length of the column of catalyst provided by standpipe 27 and partition 28 may be substantially shorter than the column of catalyst provided by standpipe 20 and partition 21.

The reaction products and unconverted ammonia are withdrawn overhead from reactor 5 through a high velocity outlet. In order to separate entrained catalyst the reactor vapors are passed through separating means such as a cyclone separator 29 located conveniently within reactor 5 at an elevated point. Catalyst separated in cyclone 29 is returned to the dense phase in reactor 5 through a standpipe 30. The reaction mixture passes from cyclone 29 through line 31 which connects with cooling means 32 and a separating vessel 33. At 32 the reaction mixture is cooled sufficiently to condense all the hydrazine hydrate and, necessarily, a part of the ammonia. The condensate thus obtained is separated in 33 from uncondensed gases and vapors and passed therefrom through line 34 to a fractionating column 35. Line 34 is provided with a pump 36 if it is desired to operate column 35 at a higher pressure. Ordinarily, however, reactor 5 is operated at pressures sufficiently high to obviate the necessity for pump 36. Fractionating column 35 is provided with the gas and liquid contact means necessary to effect separation between hydrazine hydrate and ammonia. For this purpose also heating means 37 is provided in the bottom of column 35 to assist in stripping ammonia from the hydrazine hydrate condensing product, and cooling means for the top of column 35 also are provided. The hydrazine hydrate product is removed as a liquid condensate from the base of column 35 through line 38. The hydrazine hydrate in line 38 will contain catalyst fines carried through the catalyst separation means by the reaction vapors. Such fines may be separated from the hydrazine hydrate product by filtration, or by redistillation of the hydrazine hydrate, or by a combination of these methods.

Ammonia vapors pass overhead through line 39 which connects with condensing means 40. Ammonia condensed at 40 is withdrawn through line 41 and passed by means of pump 42 to line 4 for recycling to the process. A part of the ammonia passing through line 41 is diverted through line 43 for passage to the top of column 35 for refluxing and to supply the cooling required at that point.

The vapors and gases uncondensed at 32 are withdrawn from vessel 33 through line 44 which connects with cooling means 45 and a separating vessel 46. At 45 the mixture of gases and vapors is cooled sufficiently to effect substantially complete condensation of ammonia. The ammonia condensate is separated at 46 and withdrawn through line 47 which is provided with pump 48. Line 47 conveniently connects with line 41 in order to recycle the ammonia for reuse in the process. The uncondensed gases are withdrawn from the system through line 49. Such gases may be further treated, as by water scrubbing, for final recovery of ammonia.

A relatively small amount of catalyst is carried through cyclone 29 by the product vapors. This material may be largely separated by passing the product mixture in the vapor form through more efficient separating means, such as an electrical precipitator. Conveniently, however, the catalyst entrained in the product vapors is recovered by condensation of a part of the product mixture and, if necessary, by scrubbing the uncondensed portion of the product mixture. A substantial part of the catalyst entrained in the vapors passing through line 31 will be recovered with the condensate which passes to column 35 through line 34. This catalyst is then separated from the hydrazine hydrate product, withdrawn through line 38, by a suitable settling means. Additional catalyst will be recovered with the condensate ammonia separated at 46. This catalyst may be recovered separately by suitable settling or filtration, or may be returned directly to the process by entrainment in the stream of ammonia in line 47. The uncondensed gases at 49 may be subjected to suitable scrubbing, as with water, to effect a final recovery of ammonia and this also will recover catalyst which can be separated by filtration. Alternatively, the product stream in line 31 may be subjected to suitable scrubbing, as with ammonia, to remove all the catalyst at one point.

It may be necessary to remove a part of the catalyst from the system, during shutdown periods, or to permit replacement of permanently deactivated catalyst. Such removal of catalyst from the system may be effected through line 50 which connects with standpipe 8. It may be desired also to add, intermittently or continuously, a small amount of the catalyst to the system to make up inevitable catalyst losses or to replace catalyst withdrawn at 50. The addition of catalyst to the system may be effected through lines 51, 52 and 53, which connect with lines 4, 12 and 25 respectively.

The methods of supplying and withdrawing catalyst to and from reactor 5 and regenerator 13 shown in the drawing are for purposes of illustration only. For example, the method of supplying catalyst through a header and withdrawing catalyst from the lowest point of the vessel as shown in connection with reactor 5 may be employed also in connection with regenerator 13, and vice versa. Either of the methods shown in connection with reactor 5 and regenerator 13 may be employed at the same time for both vessels. Furthermore, in connection with either or both of reactor 5 and regenerator 13 the catalyst to be removed may be carried overhead by entrainment through a high velocity outlet and separated at an elevated point, from which the catalyst to be transferred may be withdrawn through a standpipe.

The levels of the dense phase in reactor 5 and regenerator 13, indicated diagrammatically at 7 and 15, are maintained sufficiently high to provide the quantities of catalyst in these vessels required by their functions. At the same time, however, the volume of each of vessels 5 and 13 is maintained sufficiently great to permit a substantial volume above the levels at 7 and 15 to facilitate separation of catalyst carried above the dense phase by entrainment. This substantially reduces the load on special separating means, such as cyclones 16 and 29.

The turbulent condition of the catalyst beds in reactor 5 and regenerator 13 produces intimate mixing of the catalyst beds, which is highly advantageous for temperature control purposes. However, the catalyst withdrawn from reactor 5 through standpipe 8 will contain some catalyst particles which are substantially highly oxidized, as well as some particles which are reduced to the maximum degree. Likewise, the catalyst returned to reactor 5 through line 4 or through line 25 will include particles which are highly oxidized, as well as particles oxidized to a lesser degree. Therefore, the net available oxygen supplied to the reaction zone in reactor 5 is represented by the difference between the oxygen combined with the catalyst supplied through lines 4 and 25 and the oxygen combined with the catalyst withdrawn through standpipe 8. It is preferred to supply ammonia and oxygen to the reaction zone in reactor 5 in a molecular ratio of ammonia to net available oxygen of at least 5:1 with ratios in the range of 15:1 to 25:1 being particularly desirable.

If desired, oxygen gas may be introduced directly into reactor 5 to supplement oxygen supplied with the catalyst. It is preferred to supply such oxygen gas in a relatively pure form, rather than as air, since the presence of the nitrogen in the reaction product complicates the recovery of the hydrazine hydrate product and the unconverted ammonia for recycling. To introduce oxygen directly into the reaction zone, line 54, provided with a compressor 55 and a valve 56, is connected to header 6 in the bottom of reactor 5 in order to mix the oxygen with the ammonia just prior to contact with the catalyst mass.

In further explanation of the invention reference may be had to a specific example of the operation of the process. In this specific operation the catalyst consists of silver oxide sufficiently finely ground to pass a 100 mesh sieve and comprising to the extent of at least 50 percent, material whose particle diameter is less than 100 microns, including a substantial proportion of material whose particle diameter is less than 25 microns. This catalyst is circulated between reactor 5 and regenerator 13 in the manner described above. The temperature in the regenerator is maintained at 400° C. and the temperature in the reactor is maintained within the range between about 100° C. and about 400° C., and preferably within the range between about 200° C. and about 300° C., with a temperature at about 270° C. being preferred in the present example. The pressure on the reactor is maintained at about 250 pounds per square inch and the regenerator pressure is approximately the same. This requires a pressure of about 255 pounds per square inch in line 4 at valve 22 and in line 12 at valve 11, the pressures of about 260 pounds per square inch in the standpipes above valves 11 and 22. Standpipes 8 and 20 and the superimposed columns of catalyst therefore develop a pressure differential of approximately 10 pounds between the entrance of valves 11 and 22 and the upper parts of reactor 5 and regenerator 13.

By means of heat supplied at 3 and by the hot catalyst supplied through standpipe 20 the ammonia is heated to a temperature of approximatly 250° C. in line 4. By thus supplying the ammonia and catalyst at a temperature approximately 20° C. below the reaction temperature the heat of reaction is absorbed and the reaction temperature is maintained at the desired level of about 270° C.

The catalyst in reactor 5 is maintained in a state of oxidation corresponding to an Ag:O ratio of approximately 2.5:1 and the catalyst in regenerator 13 is maintained in a state of oxidation corresponding to a ratio of 2.2:1. Ammonia is charged to reactor 5 in an $NH_3:O_2$ ratio of about 20:1. This requires transferring the catalyst from regenerator 13 to reactor 5 in an ammonia:catalyst feed weight ratio of approximately 2:1.

The ammonia gas is passed upwardly through the mass of catalyst in reactor 5 at a superficial velocity of about 1 foot per second. The height of the dense phase is adjusted to provide a residence time for the ammonia in the dense phase of approximately 3 seconds. By this means, and by suitable regulation of the quantity of catalyst in reactor 5, the conversion rate per pass of the ammonia is limited to less than 20% and is preferably limited to approximately 10 percent. For this purpose the space velocity is maintained at about 5000 vapor volumes of ammonia per hour per volume of the dense phase, corresponding to approximately four weights of ammonia charge per hour per weight of catalyst in the dense phase.

The silver oxide fines contained in the hydrazine hydrate at 38 are separated by settling, and returned to the process. The silver oxide fines separated in the ammonia at 47 are returned to the process in suspension in the ammonia. The tail gas at 49 is scrubbed with water to recover ammonia and the final traces of catalyst, both of which are separated from the water for return to the process.

A method for producing hydrazine hydrate by contacting oxygen and ammonia at an elevated temperature in the presence of a metallic catalyst, is disclosed in my co-pending application, S. N. 688,718 filed August 6, 1946.

I claim:

1. A method for producing hydrazine hydrate which comprises: contacting ammonia with an effective quantity of a contact agent comprising a reducible metal oxide in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

2. A method for producing hydrazine hydrate which comprises: contacting ammonia with an effective quantity of a contact agent comprising a reducible oxide of a metal of the right hand column of group I of the periodic table in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

3. A method for producing hydrazine hydrate which comprises: contacting ammonia with an effective quantity of a contact agent comprising a reducible metal oxide in a mol ratio of ammonia to net available oxygen between about 15:1 and about 25:1 in a reaction zone at an elevated temperature and at superatmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

4. A method for producing hydrazine hydrate which comprises: contacting ammonia with an effective quantity of a contact agent comprising a reducible metal oxide in a mol ratio of ammonia to net available oxygen of at least 5:1 in a reaction zone at a temperature between about 100° C. and about 400° C. and at a super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

5. A method for producing hydrazine hydrate which comprises: contacting ammonia with an effective quantity of a contact agent comprising a reducible metal oxide in a mol ratio of ammonia to net available oxygen of at least 5:1 in a reaction zone at a temperature between about 200° C. and about 300° C. and at a super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

6. A method for producing hydrazine hydrate which comprises: contacting ammonia with an effective quantity of a contact agent comprising a reducible metal oxide in a mol ratio of ammonia to net available oxygen of at least 5:1 in a reaction zone at an elevated temperature and at a pressure of about 250 pounds per square inch to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

7. A method for producing hydrazine hydrate which comprises: contacting ammonia with an effective quantity of a contact agent comprising a reducible metal oxide in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to approximately 10% of that charged to the reaction zone; continuing contact of said metal oxide wtih said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

8. A method for producing hydrazine hydrate which comprises: contacting ammonia with an effective quantity of a contact agent comprising a reducible metal oxide in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction, for a contact time of approximately 3 seconds whereby the conversion of ammonia per pass is restricted to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

9. A method for producing hydrazine hydrate which comprises: contacting ammonia with an effective quantity of a contact agent comprising a reducible oxide of a metal of the right hand column of group I of the periodic table in a mol ratio of ammonia to net available oxygen between about 15:1 and about 25:1 in a reaction zone at a temperature between about 100° C. and about 400° C. and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

10. A method for producing hydrazine hydrate which comprises: contacting ammonia with an effective quantity of a contact agent comprising silver oxide in a mol ratio of ammonia to net available oxygen between about 15:1 and about 15:1 in a reaction zone at a temperature between about 200° C. and about 300° C. and at a pressure af about 250 pounds per square inch to oxidize the ammonia to hydrazine hydrate and reduce the silver oxide, said silver oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia and withdrawing the hydrazine hydrate reaction product from the reaction zone.

11. A method for producing hydrazine hydrate which comprises: contacting ammonia with an effective quantity of a contact agent comprising a reducible metal oxide in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; withdrawing the hydrazine hydrate reaction product from said reaction zone; withdrawing the reduced metal oxide from contact with ammonia from said reaction zone; separately subjecting the reduced metal oxide to oxidation treatment to reoxidize it to its original state of oxidation; and further contacting the reoxidized metal oxide with ammonia in the first-mentioned step.

12. A method for producing hydrazine hydrate which comprises: contacting ammonia with an effective quantity of a contact agent comprising a reducible oxide of a metal of the right hand column of group I of the periodic table in a mol ratio of ammonia to net available oxygen of at least 5:1 in a reaction zone at a temperature between about 100° C. and about 400° C. and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; withdrawing the hydrazine hydrate reaction product from said reaction zone; withdrawing the reduced metal oxide from contact with ammonia from said reaction zone; separately subjecting the reduced metal oxide to oxidation treatment to reoxidize it to its original state of oxidation; and further contacting the reoxidized metal oxide with ammonia in the first-mentioned step.

13. A method for producing hydrazine hydrate which comprises: contacting ammonia with an effective quantity of a contact agent comprising a reducible oxide of a metal of the right hand column of group I of the periodic table in a mol ratio of ammonia to net available oxygen between about 15:1 and about 25:1 in a reaction zone at a temperature between about 100° C. and about 400° C. and at a pressure of about 250 pounds per square inch to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; withdrawing the hydrazine hydrate reaction product from said reaction zone; withdrawing the reduced metal oxide from contact with ammonia from said reaction zone; separately subjecting the reduced metal oxide to oxidation treatment to reoxidize it to its original state of oxidation; and further contacting the reoxidized metal oxide with ammonia in the first-mentioned step.

14. A method for producing hydrazine hydrate which comprises: contacting ammonia with an effective quantity of a contact agent comprising silver oxide in a mol ratio of ammonia to net available oxygen between about 15:1 and about 25:1 in a reaction zone at a temperature between about 200° C. and about 300° C. and at a pressure of about 250 pounds per square inch to oxidize the ammonia to hydrazine hydrate and reduce the silver oxide, said silver oxide being the major source of oxygen for the hydrazine-producing reaction and the contact time at the operating conditions selected being limited to restrict the conversion of ammonia per pass to less than 20% of that charged to the reaction zone; withdrawing the hydrazine hydrate reaction product from said reaction zone; withdrawing the reduced silver oxide from contact with ammonia from said reaction zone; separately subjecting the reduced silver oxide to oxidation treatment to reoxidize it to its original state of oxidation; and further contacting the reoxidized silver oxide with ammonia in the first-mentioned step.

15. A method for producing hydrazine hydrate which comprises: continuously introducing ammonia and an effective quantity of a contact agent comprising a reducible metal oxide in a mol ratio of ammonia to net available oxygen of at least 5:1 into a reaction zone; contacting said ammonia and metal oxide at an elevated temperature in said reaction zone and at superatmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuously withdrawing the hydrazine hydrate reaction product from said reaction zone; continuously withdrawing the reduced metal oxide from contact with ammonia from said reaction zone; continuously reoxidizing the withdrawn metal oxide in a separate oxidation zone by contact with gaseous oxygen to its original state of oxidation; and continuously returning the reoxidized metal oxide to the first-mentioned reaction zone.

16. A method for producing hydrazine hydrate which comprises: continuously introducing ammonia, gaseous oxygen and an effective quantity of a contact agent comprising a reducible metal oxide in a mol ratio of ammonia to net available oxygen of at least 5:1 into a reaction zone; contacting said ammonia and metal oxide at an elevated temperature in said reaction zone and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuously withdrawing the hydrazine hydrate reaction product from said reaction zone; continuously withdrawing the reduced metal oxide from contact with ammonia from said reaction zone; continuously reoxidizing the withdrawn metal oxide in a separate oxidation zone by contact with gaseous oxygen to its original state of oxidation; and continuously returning the reoxidized metal oxide to the first-mentioned reaction zone.

17. A method for producing hydrazine hydrate which comprises: continuously introducing ammonia and an effective quantity of a contact agent comprising silver oxide in a mol ratio of ammonia to net available oxygen between about 15:1 and about 25:1 into a reaction zone; contacting said ammonia and silver oxide at a temperature between about 200° C. and about 300° C. in said reaction zone and at a pressure of about 250 pounds per square inch to oxidize the ammonia to hydrazine hydrate and reduce the silver oxide, said silver oxide being the major source of oxygen for the hydrazine-producing reaction and the contact time at the operating conditions selected being limited to restrict the conversion of ammonia per pass to less than 20% of that charged to the reaction zone; continuously withdrawing the hydrazine hydrate reaction product from said reaction zone; continuously withdrawing the reduced silver oxide from contact with ammonia from said reaction zone; continuously reoxidizing the withdrawn silver oxide in a separate oxidation zone by contact with gaseous oxygen to its original state of oxidation; and continuously returning reoxidized silver oxide to the first-mentioned reaction zone.

18. A method for producing hydrazine hydrate which comprises: continuously introducing ammonia, gaseous oxygen and an effective quantity of a contact agent comprising silver oxide in a mol ratio of ammonia to net available oxygen between about 15:1 and about 25:1 into a reaction zone; contacting said ammonia and silver oxide at a temperature between about 200° C. and about 300° C. in said reaction zone and at a pressure of about 250 pounds per square inch to oxidize the ammonia to hydrazine hydrate and reduce the silver oxide, said silver oxide being the major source of oxygen for the hydrazine-producing reaction and the contact time at the operating conditions selected being limited to restrict the conversion of ammonia per pass to less than 20% of that charged to the reaction zone; continuously withdrawing the hydrazine hydrate reaction product from said reaction zone; continuously withdrawing the reduced silver oxide from contact with ammonia from said reaction zone; continuously reoxidizing the withdrawn silver oxide in a separate oxidation zone by contact with gaseous oxygen to its original state of oxidation; and continuously returning reoxidized silver oxide to the first-mentioned reaction zone.

19. A method for producing hydrazine hydrate which comprises: continuously passing ammonia gas through a reaction zone upwardly through a mass of a powdered reducible metal oxide in a mol ratio of ammonia to net available oxygen of at least 5:1, passing the ammonia upwardly through the mass of powdered metal oxide at a relatively low velocity whereby the metal oxide is separated in the ammonia stream as a dense, pseudo-liquid mass in which the particles circulate at a high rate; maintaining the reaction zone at an elevated temperature effective to produce oxidation of the ammonia to hydrazine hydrate and reduction of the metal oxide; continuously withdrawing the hydrazine hydrate reaction product from said reaction zone at an upper point therein; continuously withdrawing a portion of the metal oxide from the reaction zone; continuously reoxidizing the withdrawn portion of the metal oxide product in a separate oxidation zone by contact with gaseous oxygen at an elevated temperature to effective reoxidation of such portion of the metal oxide which has been reduced in the reaction zone; and continuously returning the reoxidized powdered metal oxide to the first-mentioned reaction zone.

20. A method for producing hydrazine hydrate which comprises: continuously passing ammonia gas, and gaseous oxygen through a reaction zone upwardly through a mass of a powdered reducible metal oxide in a mol ratio of ammonia to net available oxygen of at least 5:1; passing the ammonia upwardly through the mass of powdered metal oxide at a relatively low velocity whereby the metal oxide is separated in the ammonia stream as a dense, pseudo-liquid mass in which the particles circulate at a high rate; maintaining the reaction zone at an elevated temperature effective to produce oxidation of the ammonia to hydrazine hydrate and reduction of the metal oxide; continuously withdrawing the hydrazine hydrate reaction product from said reaction zone at an upper point therein; continuously withdrawing a portion of the metal oxide from the reaction zone; continuously reoxidizing the withdrawn portion of the metal oxide product in a separate oxidation zone by contact with gaseous oxygen at an elevated temperature to effective reoxidation of such portion of the metal oxide which has been reduced in the reaction zone; and continuously returning the reoxidized powdered metal oxide to the first-mentioned reaction zone.

21. A method for producing hydrazine hydrate which comprises: contacting ammonia and gaseous oxygen with an effective quantity of a contact agent comprising a reducible metal oxide in a mol ratio of ammonia to net available oxygen of at least 5:1 in a reaction zone at an elevated temperature and at super-atmospheric pressure to oxidize the ammonia to hydrazine hydrate and reduce said metal oxide, said reducible metal oxide being the major source of oxygen for the hydrazine-producing reaction and the contact time at the operating conditions selected being limited to restrict the conversion of ammonia per pass to less than 20% of that charged to the reaction zone; continuing contact of said metal oxide with said ammonia until the metal oxide is substantially reduced; withdrawing metal oxide from contact with ammonia; bringing a fresh supply of unreduced metal oxide into contact with said ammonia; and withdrawing the hydrazine hydrate reaction product from the reaction zone.

WALTON H. MARSHALL, JR.

REFERENCES CITED

The following references are of record in the file of this patent:

UNITED STATES PATENTS

| Number | Name | Date |
|---|---|---|
| 858,904 | Ostwald | July 2, 1907 |
| 1,237,884 | Ellis | Aug. 21, 1917 |
| 1,332,291 | Glassen | Nov. 18, 1919 |
| 1,558,598 | Ellis | Oct. 27, 1925 |
| 1,899,184 | De Simo | Feb. 28, 1933 |
| 2,421,664 | Tyson | June 3, 1947 |

OTHER REFERENCES

Inorganic Chemistry, pages 173–4, F. Ephraim, 4th ed. 1943.

Handbuch der Anorganischem Chemie, 1.1 Gmelin-Kraut, 1907, page 192.

Lassor-Cohn Arbeitsmethoden fur Organisch-Chemische Laboratorien, 4 Auglang, page 949, Spegiellen Test Leipzig, 1907.

Chemical Society Journal (1932), pages 1169–1172 (Part I).

Chemical Abstracts (1930), page 1310, vol. 24.

Chemical Abstracts (1908), page 1533, vol. 2.